United States Patent [19]
Okamoto et al.

[11] Patent Number: 5,531,111
[45] Date of Patent: Jul. 2, 1996

[54] STRUCTURE OF A VOLUMETRIC MEASURING APPARATUS

[75] Inventors: Yoshiyuki Okamoto, Nagoya; Yasuhiro Horiuchi, Toyota; Kouichi Yamada, Aichi; Kazuhiko Yamaguchi, Gifu; Hidekuni Sugi, Nagoya, all of Japan

[73] Assignee: Nippondenso Co., Ltd., Aichi-Pref., Japan

[21] Appl. No.: 431,043

[22] Filed: Apr. 28, 1995

[30] Foreign Application Priority Data

Apr. 28, 1994 [JP] Japan ................................. 6-092687
Feb. 10, 1995 [JP] Japan ................................. 7-023237

[51] Int. Cl.$^6$ ................................................. G01F 17/00
[52] U.S. Cl. ....................................... 73/149; 73/290 V
[58] Field of Search .............................. 73/149, 290 V, 73/861.47

[56] References Cited

U.S. PATENT DOCUMENTS

| | | | |
|---|---|---|---|
| 3,075,382 | 1/1963 | Mathias | 73/149 |
| 3,237,451 | 3/1966 | Haeff . | |
| 4,704,902 | 11/1987 | Doshi | 73/149 |
| 4,713,966 | 12/1987 | Thyren et al. | 73/149 |
| 5,309,769 | 5/1994 | Watanabe et al. | 73/149 |

FOREIGN PATENT DOCUMENTS

| | | | |
|---|---|---|---|
| 486264A2 | 5/1992 | European Pat. Off. | 73/149 |
| 59-164916 | 9/1984 | Japan . | |
| 2-19716 | 1/1990 | Japan . | |
| 0200019 | 9/1991 | Japan | 73/149 |
| 4-47231 | 2/1992 | Japan . | |
| 4268416 | 9/1992 | Japan . | |
| 620977 | 6/1994 | Japan . | |
| 6273212 | 9/1994 | Japan . | |

*Primary Examiner*—Richard Chilcot
*Assistant Examiner*—Paul D. Amrozowicz
*Attorney, Agent, or Firm*—Cushman Darby & Cushman

[57] ABSTRACT

A volumetric measurement apparatus is provided which measures the volume of a liquid material stored within a container. The volumetric measurement apparatus includes a reference enclosure having disposed therein a single pressure sensor. The pressure sensor has a pressure sensitive element exposed to both internal spaces of the reference enclosure and the container to detect a pressure difference between the container and the reference enclosure. A sensor shielding member is arranged in the reference enclosure to selectively shield the pressure sensitive element from the internal space of the reference enclosure to detect only a pressure within the container. The volumetric measurement is made based on the pressure difference between the container and the reference enclosure and the pressure in the container.

24 Claims, 13 Drawing Sheets

REFERENCE
ENCLOSURE 3

FUEL TANK 2

DISTANCE (D) BETWEEN SURFACE OF
LIQUID AND LOWER END OF THROAT

STRUCTURE OF A VOLUMETRIC MEASURING APPARATUS

BACKGROUND OF THE INVENTION

1. Technical Field

The present invention relates generally to a volumetric measuring apparatus, and more particularly to an improved structure of a volumetric measuring apparatus which measures the volume of a liquid material stored within a container by subtracting the volume of gas filling an empty portion of the container from the volume of the container.

2. Background Art

Japanese Patent First Publication No. 59-164916 teaches a volumetric measurement system which has a pair of volume-changing means and a pressure sensor means. The volume-changing means are disposed within a liquid-stored container and a reference enclosure communicating with the container. The pressure sensor means detects pressures in the container and the reference enclosure independently. The volume of the liquid in the container is determined based on a ratio of the pressures in the container and the reference enclosure.

In order to detect the pressures in the container and the reference enclosure, the above prior art volumetric measurement system teaches two pressure sensors mounted in the container and the reference enclosure, respectively. As an alternative form, a single pressure sensor and a directional control valve are also proposed. In this arrangement, the pressure sensor communicates with the container and the reference enclosure through separate pressure lines. The directional control valve switches between the pressure lines to detect the pressures in the container and the reference enclosure separately. These prior art arrangements, however, result in a complex structure of the volumetric measurement system, increasing manufacturing costs.

SUMMARY OF THE INVENTION

It is, therefore, a principal object of the present invention to avoid the disadvantages of the prior art.

It is another object of the present invention to provide an improved simple structure of a volumetric measuring apparatus which includes a single pressure sensor means designed to detect pressures both in a container and a reference enclosure.

According to one aspect of the present invention, there is provided a volumetric measuring apparatus for measuring the volume of a given material stored within a container which comprises (a) a reference enclosure, disposed within the container, defining therein a reference cavity having a preselected volume, (b) a pressure balancing means for balancing static pressures in the container and the reference enclosure with each other, (c) a pressure difference producing means for producing a pressure difference between pressures in the container and the enclosure, (d) a pressure sensor having a pressure sensitive element exposed inside both the container and the reference enclosure, the pressure sensitive element being sensitive to a pressure acting thereon to provide a sensor signal indicative thereof, (e) a sensor mode switching means for switching an operation of the pressure sensor between a first operation mode and a second operation mode, the first operation mode being such that the pressure sensitive element of the pressure sensor is sensitive to the pressure difference between the container and the reference enclosure, the second operation mode being such that the pressure sensitive element of the pressure sensor is sensitive to a pressure only In one of the container and the reference enclosure, (f) a control means for controlling operations of the pressure difference producing means and the sensor mode switching means in first and second control modes, the first control mode being such that the pressure difference producing means produces thee pressure difference between the container and the reference enclosure and the sensor mode switching means activates the pressure sensor in the first operation mode to provide a first sensor signal indicative of the pressure difference, the second control means being such that the pressure difference producing means produces the pressure difference and the sensor mode switching means,activates the pressure sensor in the second operation mode to provide a second sensor signal indicative of the pressure in the one of the container mad the reference enclosure, and (g) a volume determining means for determining the volume of the given material stored within the container based on the first sensor signal and the second sensor signal provided by the pressure sensor.

In the preferred mode of the invention, the volume determining means determines the volume of the given material based on a ratio of outputs values of the first and second sensor signals.

The sensor mode switching means includes a cover member formed to define therein a preselected volume and an opening and closing means. The cover member has disposed therein the pressure sensitive element of the pressure sensor. The opening and closing means selectively opens and closes the cover member to establish the first and second operating modes of the pressure sensor.

The preselected volume in the cover member is so defined as to compensate for an error in determining the volume of the given material within the container caused by a variation in internal static pressure of the container.

The cover member has a communication port which establishes communication between the pressure sensitive element of the pressure sensor and an internal space of the one of the container and the reference enclosure. The opening and closing means is responsive to a control signal from the control means to selectively establish and block the communication to have the pressure sensor assume the first and second operation modes.

The pressure difference producing means is disposed within the reference enclosure and generates a vibration within the container to change a volume in the container. The pressure sensor detects a pressure change in the container in the second operation mode.

The pressure difference producing means is provided with an acoustic speaker which has a diaphragm oriented toward a bottom of the container and which transmits a preselected frequency of vibration inside the container through a propagation hole formed in the bottom of the container to produce a pressure variation in the container.

The reference enclosure may include a first chamber and a second chamber. The second chamber is disposed on an outer bottom wall of the first chamber and communicating with the first chamber and an Internal space of the container through a first opening and a second opening, respectively. A float member is further provided which has a specific gravity smaller than that of the given material to block the second opening when the given material reaches a given level within the container.

The given material stored within the container is liquid. A capillary means may be further provided for attracting and directing a portion of liquid collected on the bottom of the reference enclosure to a heating element of the speaker for evaporation.

The reference enclosure may includes an inner housing disposed within the container and an outer housing, disposed out of the container, communicating with the Inner housing. The pressure difference producing means, the pressure sensor, and the sensor mode switching means may be arranged within the inner housing. The inner housing of the reference enclosure communicates with the outer housing through an opening formed in the container. The outer housing has a through hole into which a bolt is inserted to secure the outer housing on an outer upper surface of the container.

The reference enclosure may have an opening formed in a bottom wall thereof to return a portion of the given material collected on the bottom back into the container.

The pressure sensitive element of the pressure sensor has a surface oriented vertically of the reference enclosure.

The reference enclosure is made of a cylindrical member which has a flat surface formed on a side wall for mounting a volumetric measuring assembly composed of the pressure sensor and the sensor mode switching means.

The reference enclosure may have a hollow extension, extending outwardly from a bottom thereof, communicating with the internal space of the container. The hollow extension forms a confined space defined by a surface of the given material when blocking the communication with the internal space of the container and the pressure difference producing means disposed within the reference enclosure to decrease an internal pressure of the reference enclosure indicated by the pressure sensor below a given threshold value. The volumetric determining means determines that the container is filled with the given material when the internal pressure indicated by the pressure sensor is smaller than the given threshold value.

The control means includes a circuit board. The pressure sensor and the sensor mode switching means may be incorporated within the volumetric measuring assembly which is disposed within the reference enclosure. The circuit board may be mounted over the volumetric measuring assembly.

The reference enclosure may have an opening enclosed by a flange member which is mounted on an upper outer surface of the container. The circuit board is secured on the flange member.

The opening and closing means includes a casing having a wall and a movable member movable into engagement with the wall of the casing to establish the communication between the pressure sensitive element of the pressure sensor and the internal space of the one of the container and the reference enclosure. The movable member may have a tapered end portion. The wall of the casing may have a tapered bulge portion for receiving therein the tapered end portion of the movable member when the communication is established between the pressure sensitive element and the internal space of the one of the container and the reference enclosure.

The control means includes a phase detector which extracts an output signal component outputted by the pressure sensor having a frequency produced for operating the pressure difference producing means, and which outputs the extracted signal component to the volume determining means.

The phase detector may combine the sensor signal from the pressure sensor and a signal synchronizing with a frequency of the vibration produced by the pressure difference producing means to provide a DC signal to the volume determining means.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

FIG, 13 is a cross sectional view which shows an opening and closing unit of a volumetric measuring assembly according to a fifth embodiment of the invention.

DESCRIPTION OF THE PREFERRED EMBODIMENT

Figure 1:
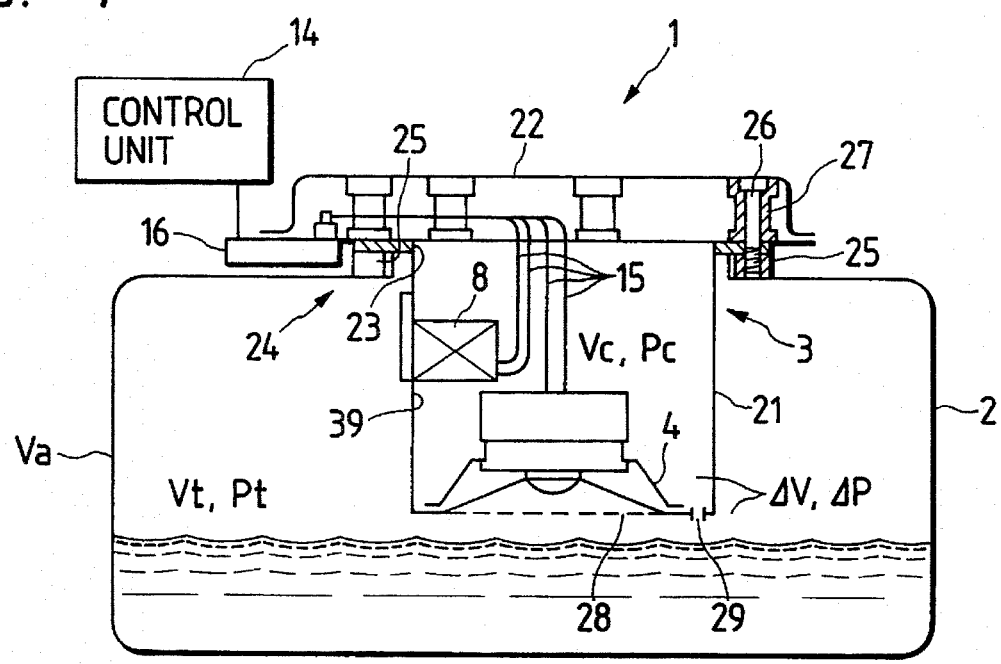
FIG. 1 is a cross sectional view which shows a volumetric measuring apparatus according to the present invention.

Referring now to the drawings, wherein like numbers refer to like parts in several views, particularly to FIG. 1, there is shown a volumetric measuring apparatus i according to the present invention.

The volumetric measuring apparatus i includes a reference enclosure 3 within a fuel tank 2 which defines therein a reference cavity in which an acoustic speaker 4 and a volumetric measuring assembly 8 are disposed.

Figure 5:
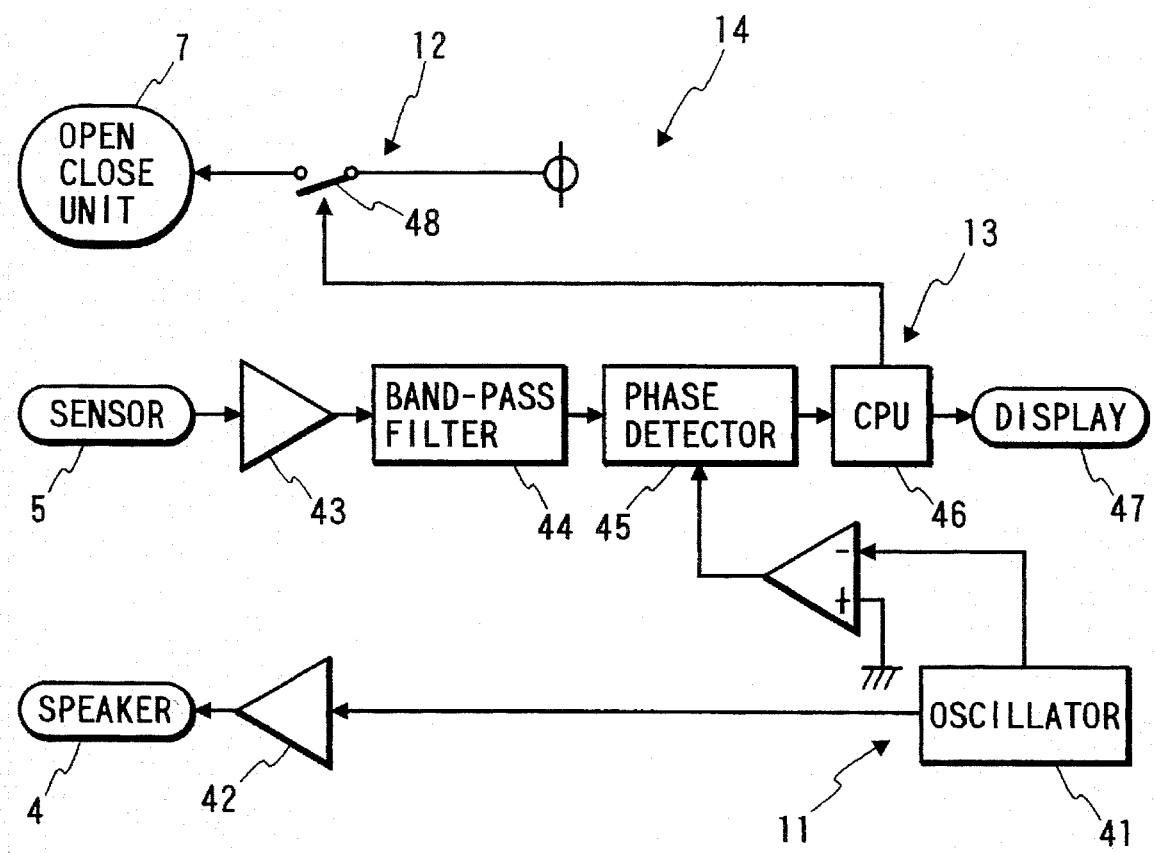
FIG. 5 is a circuit diagram of a control unit of a volumetric measuring apparatus.

The volumetric measuring apparatus 1 further includes a control unit 14, as shown in FIG. 5, which is mounted outside the fuel tank 2. The control unit 14 is composed of a speaker driver 11 for driving the speaker 4, an opening and closing unit controller 12 for controlling an operation of the opening and closing unit 7, and a volumetric measuring circuitry 13 which is responsive to a signal from the pressure sensor 5 to determine the volumes of gas and fuel within the fuel tank 2. The speaker 4, the speaker driver 11, the opening and closing unit 7, and the opening and closing unit controller 12, the pressure sensor 5, and the volumetric measuring circuitry 13 are, as can be seen in FIG. 1, Connected through lead wires 15 and a connector 16.

The reference enclosure 3 is formed with a vertically extending cylindrical member having a fixed volume which includes an inner housing 21 disposed within the fuel tank 2 and an outer housing 22, communicating with the inner housing 21, arranged on an upper surface of the fuel tank 2. The fuel tank 2 has a circular opening 23 through which the inner housing 21 of the reference enclosure 3 is inserted. Disposed around the circular opening 23 is a tank flange 24 which secures the reference enclosure 3 and seals the circular opening 23. The tank flange 24 has therearound a plurality of nuts fixed by welding, for example.

The outer housing 22 is greater in diameter than the tank opening 23, and has a plurality of vertically extending bolt holes 27 through which bolts 26 are inserted for engagement with the nuts 25 to mount the reference enclosure 3 on the fuel tank 2.

Figure 2:
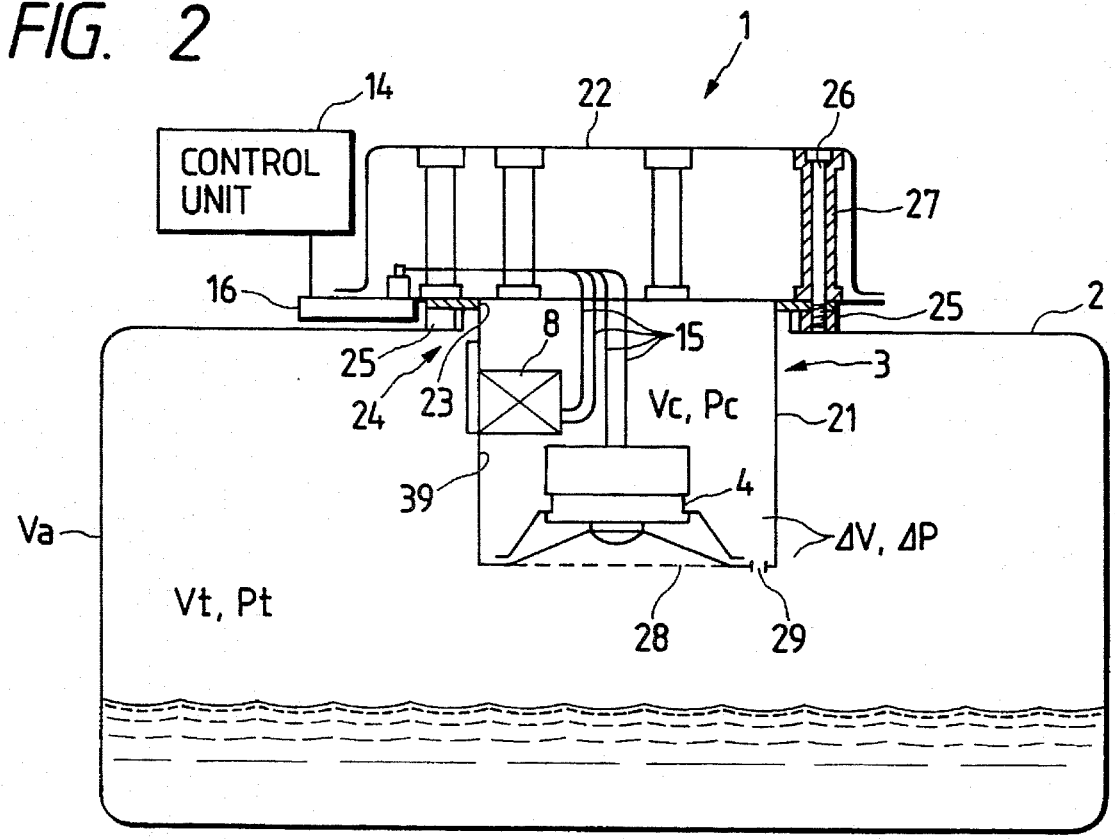
FIG. 2 is a cross sectional view which shows a modification of the volumetric measuring apparatus shown in FIG. 1.

Note that the volume of the reference enclosure 3 may be changed easily by using a vertically extending outer housing 22, as shown in FIG. 2, instead of the one shown in FIG. 1.

The speaker 4 is oriented downward and mounted on a flat bottom surface of the inner housing 21 using screws. The bottom surface of the inner housing 21 has formed therein a plurality of propagation openings 28 each having a diameter of more than 5 mm for propagating pressure variations produced by vibrations of a cone sheet (i.e., a diaphragm) of the speaker 4 into the fuel tank 2.

In a portion of the bottom of the inner housing 21 around the speaker 4, at least one leakage hole 29 is formed which establishes communication between the reference enclosure 3 and the fuel tank 2. The leakage hole 29 serves to return a liquid fuel collected on the bottom of the inner housing 21 back to the fuel tank 2 and balances a static pressure within the fuel tank 2 with that within the reference enclosure 3. The diameter of the leakage hole 29 is so set as to restrict transmission of an output from the speaker 4 which has, for example, an inaudible frequency of 10 to 40 Hz.

Figure 3:
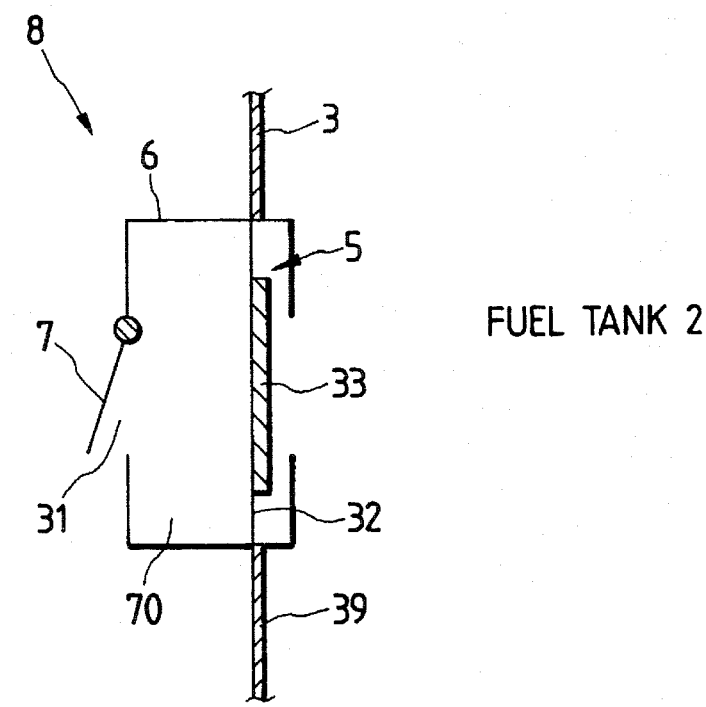
FIG. 3 is a schematic view which shows a volumetric measuring assembly.
Figure 4:
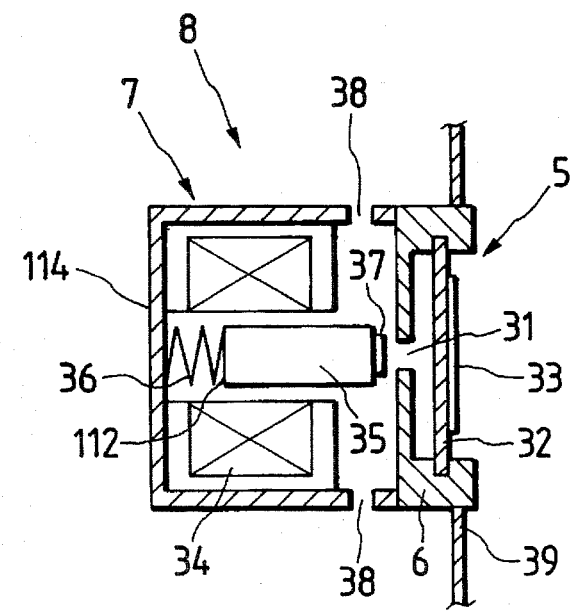
FIG. 4 is a cross sectional view which shows the volumetric measuring assembly shown in FIG. 3.

The volumetric measuring assembly 8, as shown in FIGS. 3 and 4, includes a pressure sensor 5, a back chamber housing 6, and, an opening and closing unit 7. The back chamber housing 6 defines therein a back chamber 70, and has formed therein a communication port 31 for communication with the inside of the reference enclosure 3. The opening and closing unit 7 is operable to selectively open and close the communication port 31. The pressure sensor 5 has a vibratory plate or diaphragm 32 which vertically extends and isolates the back chamber from the fuel tank 2. The pressure sensor 5 senses vibrations of the diaphragm 32 and converts them into electric signals.

The back chamber 70 has a preselected volume which is, as will be discussed later in detail, so defined by the inner wall thereof and the diaphragm 32 as to substantially eliminate a measurement error caused by a variation in internal pressure of the fuel tank 2 and a variation in atmospheric pressure surrounding the fuel tank 2.

The pressure sensor 5 also includes a piezoelectric element 33 attached to almost the entire surface of the diaphragm 32. The diaphragm 32 is responsive to the pressure acting thereon to deform. The piezoelectric element 33 converts the mechanical deformation of the diaphragm 32 into an electric energy to produce a voltage to the volumetric measuring circuitry 13 of the control unit 14. Note that the pressure sensor 5 may alternatively be provided with any other sensor such as a microphone or a speaker which is capable of translating a pressure variation into an electric signal.

The opening and closing unit 7 is, as shown in FIG. 4, provided with a solenoid valve. When a solenoid 34 is energized in response to a control signal from the opening and closing unit controller 12 of the control unit 14, it will produce an electromagnetic force to draw an armature 35 against a spring force of a spring 36, so that the communication port 31 is opened, while when the solenoid 34 is deenergized, the armature 35 is urged by the spring force of the spring 36 so as to close the communication part 31. Installed on an end portion of the armature 35 is a rubber packing or seal 37 for hermetically sealing the communication port 31 when closed by the armature 35. Openings 38 are formed in a valve casing for communication between the communication port 31 and the reference enclosure 3.

The openings 38 may be placed with a single hole. Additionally, the solenoid valve may be placed by an electric motor or a bimetal.

The volumetric measuring assembly 8 is retained by screws on a mounting portion 39 formed on an inner side wall of the inner housing 21 so as to orient the diaphragm 32 of the pressure sensor 5 vertically. The mounting portion 39 has a flat surface for facilitating easy installation of the volumetric measuring assembly 8.

The control unit 14, as already discussed, includes the speaker driver 11, the opening and closing unit controller 12, and the volumetric measuring circuitry 13. The speaker driver 11, as shown in FIG. 5, includes an oscillator 41 producing a wave signal having a given frequency (e.g., 10 to 40 Hz) and a power amplifier 42 amplifying the wave signal produced by the oscillator 41 to transmit it to the speaker 4.

The volumetric measuring circuitry 13 includes a preamplifier 43, a band-pass filter 44, a phase detector 45, a CPU 46, and a display 47. The preamplifier 43 amplifies an output from the pressure sensor 5 to provide it to the band-pass filter 44. The band-pass filter 44 attenuates frequencies other than the frequency produced by the oscillator 41 to remove unwanted noise from the output of the preamplifier 43. The phase detector 45 extracts an output signal component having the frequency produced by the oscillator 41. The CPU 46 determines the volume of liquid fuel stored in the fuel tank 2 and the volume of gas filling an empty portion of the fuel tank 2 based on the output from the phase detector 45. The display 47 may be installed in a cabin of an automotive vehicle to inform an vehicle operator of the volume of the liquid fuel remaining in the fuel tank 2 determined by the CPU 46.

The opening and closing unit controller 12 has a switch 48 which turns on and off in response to a command from the CPU 46 to control energization of the solenoid 34 of the opening and closing unit 7.

A basic operation of the CPU 46 to determine the volume of fuel in the fuel tank 2 will be discussed below.

When the communication port 31 of the pressure sensor 5 is opened by the opening and closing unit 7, the pressure sensor 5 detects a pressure difference or variation $\Delta P$, if produced, between a pressure change Pc in the reference enclosure 3 and a pressure change Pt in the fuel tank 2 ($\Delta P = Pc - Pt$). Conversely, when the communication port 31 is closed, the pressure sensor 5 detects only the pressure change Pt in the fuel tank 2.

The CPU 46 determines a volume of gas vt within the fuel tank 2 according to the following equation:

$$Vt = Vc \cdot |\Delta P + Pt|/|Pt| \qquad (1)$$

where Vc is the volume of the reference enclosure 3.

If the volume of the fuel tank 2 is defined as Va, a volume of the fuel Vf may be expressed by the following relation:

$$Vf = Va - Vt \qquad (2)$$

The CPU 46 determines the volume of fuel Vf within the fuel tank 2 based on the following equation which is obtained by both the above equations (1) and (2).

$$Vf = Va - Vc \cdot |\Delta P + Pt|/|Pt| \qquad (3)$$

Next, an operation of the CPU 46 using the speaker 4 to improve the accuracy of volumetric measurement will be discussed below.

When the speaker 4 is actuated, it will cause the corn sheet thereof (i.e, the diaphragm) to vibrate, leading to a variation in volume $\Delta V$ so that the pressure change Pt in the fuel tank 2 is caused. The pressure change Pc in the reference enclosure 3 under this condition may be given by the following equation:

$$Pc = \gamma \cdot Po \cdot \Delta V / Vc \qquad (4)$$

where $\gamma$ is a ratio of specific heat and Po is a static pressure.

Figure 6:
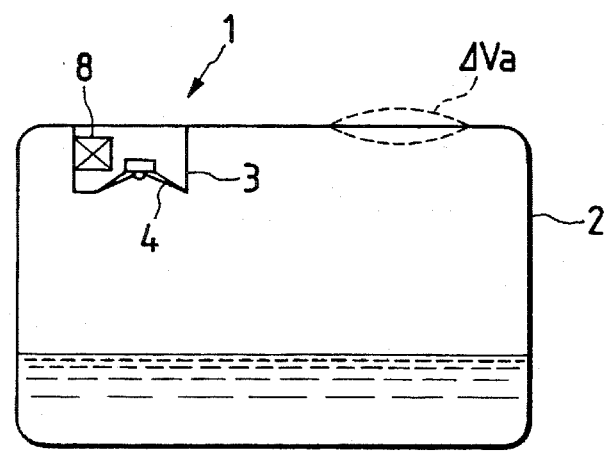
FIG. 6 is a cross sectional view which shows a container partly deformed by a variation in internal pressure.

The fuel tank 2, when the speaker is actuated to cause the pressure change Pt in the fuel tank 2, deforms mechanically as shown in FIG. 6. The mount of the mechanical deformation $\Delta Va$ may be expressed by the following equation:

$$\Delta Va = Pt \cdot kt \cdot Va \qquad (5)$$

where kt is a deformation factor dependent upon the rigidity of the fuel tank 2.

Thus, the pressure change Pt in the fuel tank 2 when the speaker 4 is operated to produce the volume variation $\Delta V$ may be given by the following relation:

$$Pt = \gamma \cdot Po \cdot (\Delta V - Pt \cdot kt \cdot Va)/Vt \qquad (6)$$

Accordingly, the volume of fuel Vf within the fuel tank 2 may be derived by the following relation:

$$Vf = Va - Vc \cdot Pc/Pt + \gamma \cdot Po \cdot kt \cdot Va \qquad (7)$$

The term ($\gamma \cdot Po \cdot kt \cdot Va$) in the above equation is an offset term. The static pressure Po is dependent upon a variation in static pressure difference between internal pressure of the fuel tank 2 and atmospheric pressure caused by a variation in amount of fuel vapor (e.g., gasoline vapor) and a variation in atmospheric pressure. Usually, the static pressure difference varies over a range from -5 kPa activating a filler cap relief valve to 20 kPa activating a canister check valve. The atmospheric pressure also varies over a range from 100 kPa at an altitude of zero (0) to, for example, 60 kPa at the top of Mt. pikes having an altitude of 4300 m in Colorado of the U.S. Note that 55 kPa<Po<120 kPa.

Figure 7:
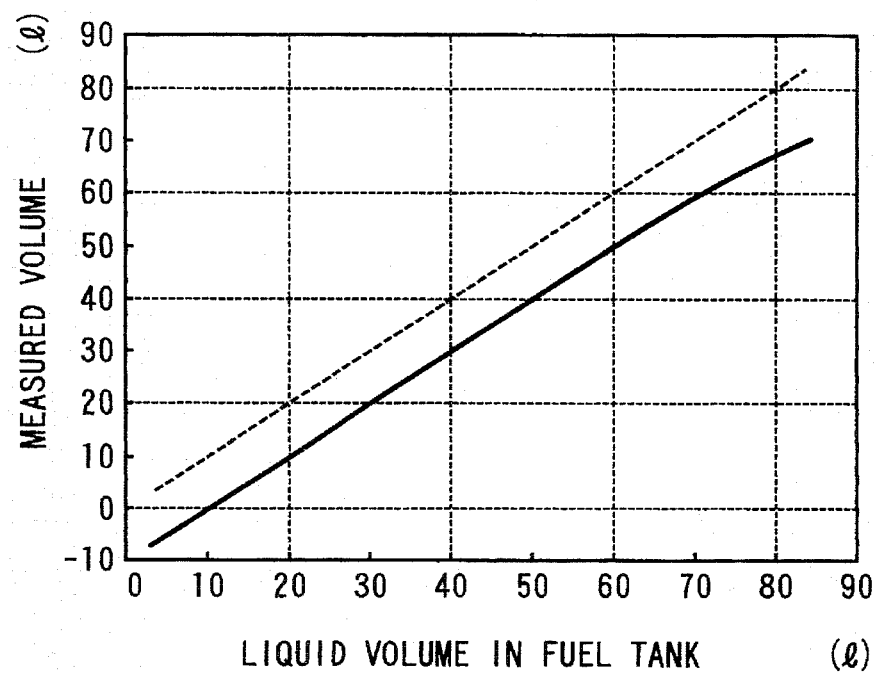
FIG. 7 is a graph which shows a relation between a measured volume of fuel stored within a fuel tank and the amount of the fuel within the fuel tank.

As will be appreciated from the above, under the variation in the static pressure Po, a difference will occur, as shown in FIG. 7, between an actual volume of fuel (indicated by a broken line) and the volume of fuel Vf (indicated by a solid line) derived by the equation (1).

An output voltage ec of the pressure sensor 5 when the communication port 31 is opened may be given by the following equation:

$$ec = (Pc - Pt) \cdot b \qquad (8)$$

where b is a sensor sensitivity (V/Pa).

Figure 8:
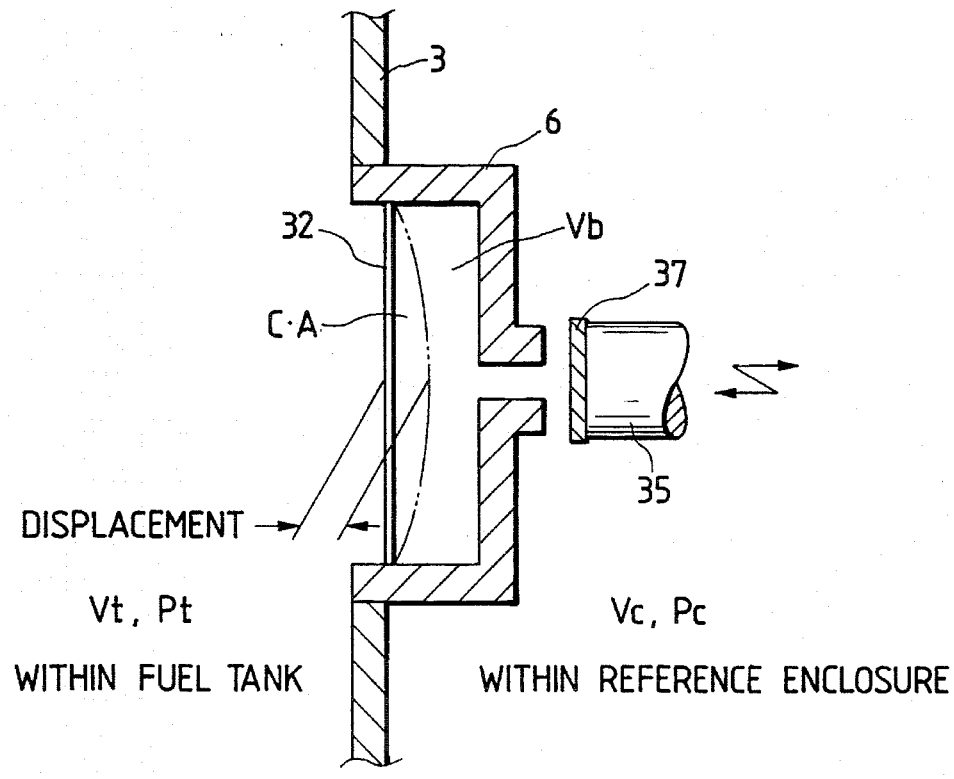
FIG. 8 is a cross sectional view which shows a volumetric measuring assembly.

An output voltage et of the pressure sensor 5 when the communication port 31 is closed may be expressed by the following equation:

$$et = Pt \cdot b/(1 + \gamma \cdot Po \cdot C \cdot A/Vb) \qquad (9)$$

where C is, as shown in FIG. 8, a displacement-pressure ratio of the diaphragm 32 (m/Pa), A is an area of the diaphragm 32 (m$^2$), and Vb is a volume of the back chamber housing 6 (cc).

Figure 9:
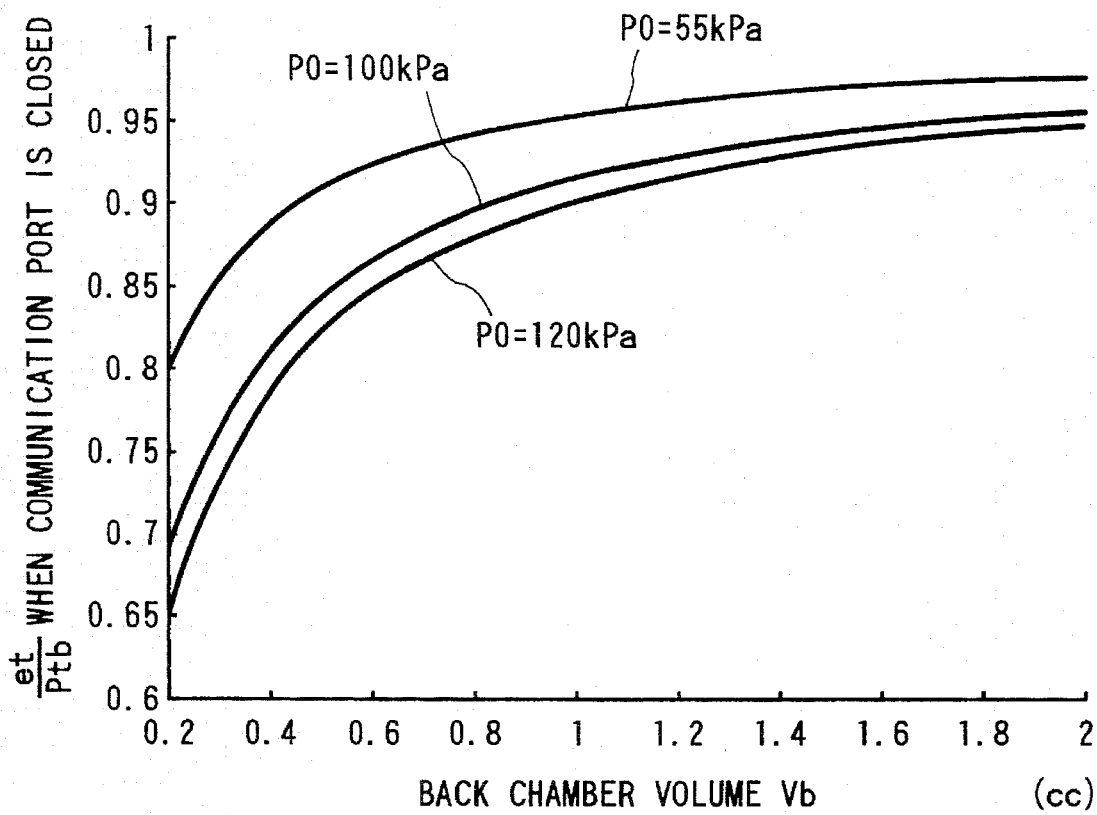
FIG. 9 is a graph which shows relations between the volume of a back chamber of an opening and closing unit and a variation in sensor output caused by a change in atmospheric pressure.
Figure 10:
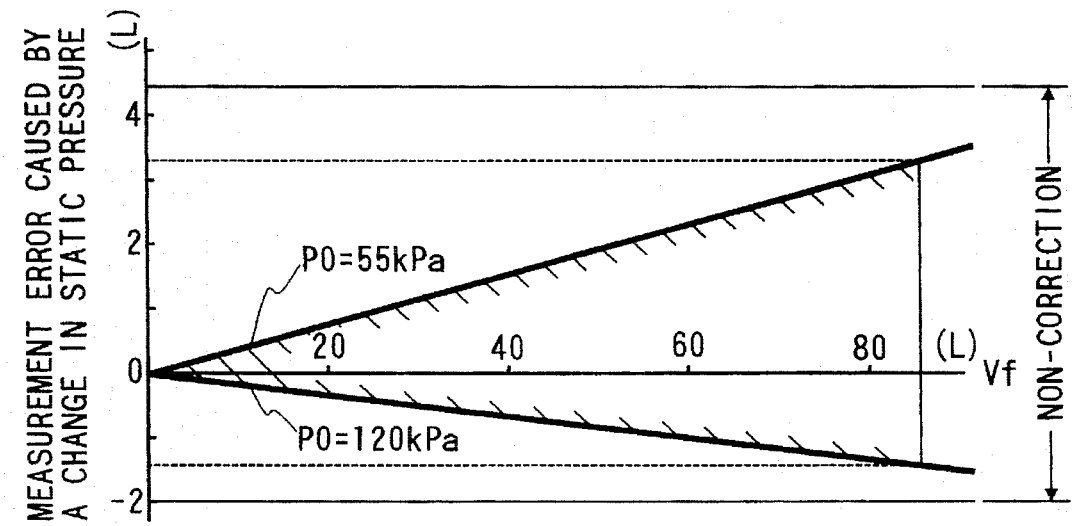
FIG. 10 is a graph which shows a volume measurement error caused by a variation in atmospheric pressure.

As seen from the equation (9), the output voltage et of the pressure sensor 5 when the communication port 31 is closed is subjected to the influence of a variation in the volume Vb of the back chamber housing 6. FIG. 9 shows output characteristics of the pressure sensor 5 when the volume Vb and the static pressure Po change.

The volume of fuel Vf within the fuel tank 2 based on the output from the pressure sensor 5 may be expressed by the following equation:

$$Vf = Va + Vc - \frac{ec}{et\left(1 + \frac{CA}{Vb} \cdot \gamma \cdot Po'\right)} \cdot Vc + \gamma \cdot Po' \cdot kt \cdot Vc \qquad (10)$$

where Po' is an initially set value of static pressure. A measurement error Ef caused by the variation in static pressure Po may be expressed by the following equation:

$$Ef = \gamma(Po - Po')\left\{\frac{CA}{Vb}(Va + Vc - Vf + \gamma \cdot Po \cdot kt \cdot Va)/\left(1 + \frac{CA}{Vb} \cdot \gamma \cdot Po'\right) - kt \cdot Va\right\} \qquad (11)$$

The measurement error Ef, when the static pressure Po was experimentally changed over a range of 55 to 120 kPa, indicated -2 to +4.5 liters (L) according to a change in the volume of fuel Vf within the fuel tank 2, as shown in FIG.

10, without correcting the volume of the back chamber housing 6 to an appropriate value.

The measurement error Ef, as can be seen from the equation (11), is also dependent upon the volume of the back chamber housing 6. If, in the equation (11), the measurement error Ef dependent upon the variation in static pressure Po is set C to zero (0), the volume Vb of the back chamber housing 6 is $$Vb = CA \left\{ \frac{Va + Vc - Vf}{kt \cdot Va} + \gamma(Po - Po') \right\} \qquad (12)$$

In this embodiment, the volume Vb of the back chamber housing 6 is set to about 1 cc which is determined using the equation (12) assuming that Vf=0 and Po=Po'=100 kPa.

Thus, it will be appreciated that it is possible to decrease the measurement error Ef to approximately zero ignoring the influence of the above mentioned offset term ($\gamma \cdot Po \cdot kt \cdot Va$) in the equation (7) caused by the variation in the static pressure Po. Accordingly, the CPU 46 may determine the volume of fuel Vf within the fuel tank 2 according to the following equation:

$$Vf = Va - Vc \cdot |Pc|/|Pt| \qquad (13)$$

In operation, the volumetric measuring apparatus 1 is activated upon starting of the engine. The speaker 4 is then actuated to produce volume variations raging from $-\Delta V$ to $+\Delta V$. The volumetric measuring assembly 8 selectively opens and closes the communication port 31 of the opening and closing unit 7 with given timing. The pressure sensor 5 thus detects a difference in pressures when the communication port 31 is opened and when it is closed. The CPU 46 of the volumetric measuring circuitry 13 is responsive to the outputs from the pressure sensor 5 to determine the volume of fuel Vf within the fuel tank 2 according to the above equation (3) or (13). The display 47 then indicates the amount of fuel remaining in the fuel tank 2.

As will be appreciated from the above explanation, the volumetric measuring apparatus 1 of the invention changes the pressures in the reference enclosure 3 and the fuel tank 2 only using the single speaker 4 without use of any other additional elements such as pressure transmission pipes or a selector valve employed in a conventional system, and determines the volume of fuel stored within the fuel tank 2 based on the outputs from the single pressure sensor 5. Therefore, it is possible to simplify an arrangement of the apparatus, thereby achieving a compact and lightweight structure thereof at economical costs and decreasing the possibility of malfunction. Additionally, the volumetric measuring apparatus 1 of the present invention, as seen from the above discussion, uses Boyle-Charles's law to determine the volume of gas filling the fuel tank 2. The gas volume determination can be achieved by providing the leakage hole 29 communicating the reference enclosure 3 with the fuel tank 2 without finding a ratio of specific heat of the gas and a static pressure in the fuel tank 2. This permits the volume of gas in the fuel tank 2 to be determined with high accuracy.

A second embodiment of the volumetric measuring apparatus 1 will be discussed below.

While the above first embodiment has the communication port 31 establishing communication between the Back chamber housing 6 and the reference enclosure 3, the second embodiment has the communication port 3 1 formed to communicate between the back chamber housing 6 and the fuel tank 2 which is selectively opened and closed by the opening and closing unit 7. Additionally, the CPU 46 of the volumetric measuring circuitry 13 uses the following equation instead of the above equation (1) to determine the volume of gas Vt.

$$Vt = Vc \cdot |A\Delta P - Pc| \qquad (14)$$

Figure 11:
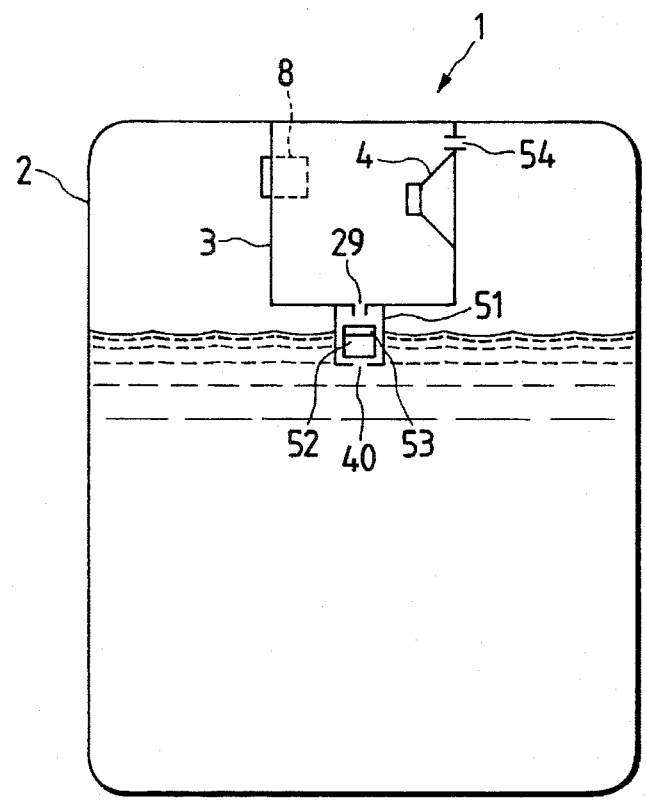
FIG. 11 is a cross sectional view which shows a volumetric measuring apparatus according to a third embodiment of the invention.

FIG. 11 shows a third embodiment of the volumetric measuring apparatus 1.

While in the above first embodiment considers the case where even though the fuel tank 2 is filled with a liquid fuel, the surface of the liquid fuel is below the reference enclosure 3, the third embodiment uses techniques of measuring the volume of a liquid fuel whose surface reaches the reference enclosure 3.

The reference enclosure 3 has a small chamber housing 51 mounted on an outer bottom wall thereof. The chamber housing 51 communicates with the reference enclosure 3 through a leakage hole 29 and also communicates with the fuel tank 2 through an opening 40 which is so sized as to allow a liquid fuel to enter the chamber housing 51. In the chamber housing 51, a float 52 is disposed which has a specific gravity smaller than that of the liquid fuel and which has a rubber seal or packing 53 mounted on an upper surface for establishing liquid-fight seal of the leakage hole 29. Specifically, when the surface of the liquid fuel reaches the reference enclosure 3, the float 52 is lifted up so that the packing 53 closes the leakage hole 29, preventing the liquid fuel from entering the reference enclosure 3.

The reference enclosure 3 also includes an opening 54 for maintaining static pressures in the reference enclosure 3 and the fuel tank 2 at a constant level.

Figure 12:
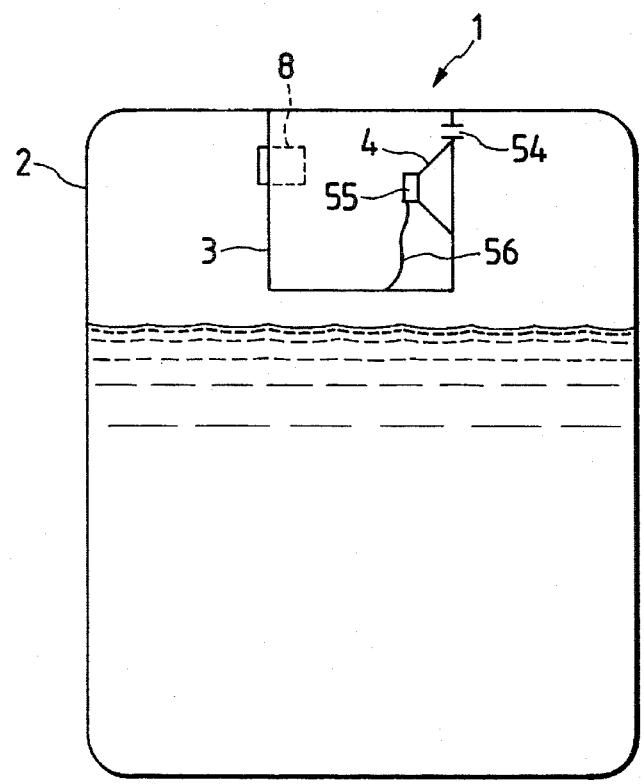
FIG. 12 is a cross sectional view which shows a volumetric measuring apparatus according to a fourth embodiment of the invention.

FIG. 12 shows a fourth embodiment of the volumetric measuring apparatus 1.

While the above first and third embodiments have the leakage hole 29 serving to return a liquid fuel back to the fuel tank 2 which is collected on the bottom of the reference enclosure 3 when a portion of a liquid fuel stored in the fuel tank 2 evaporates, enters the reference enclosure 3, and then is condensed, the fourth embodiment has a capillary means 56 made of, for example, a fiber member such as spring or cloth which attracts and elevates a liquid fuel collected on the bottom of the referenced enclosure 3 near a coil 55 (i.e., a heating element) of the speaker 4. The liquid fuel elevated is evaporated by the heat of the coil 55 and then returned back to the fuel tank 2 through the opening 54. Thus, during operation of the volumetric measuring apparatus 1 (i.e., the speaker 4), the fuel collected on the bottom of the reference enclosure 3 is constantly discharged to the fuel tank 2.

Figure 13:
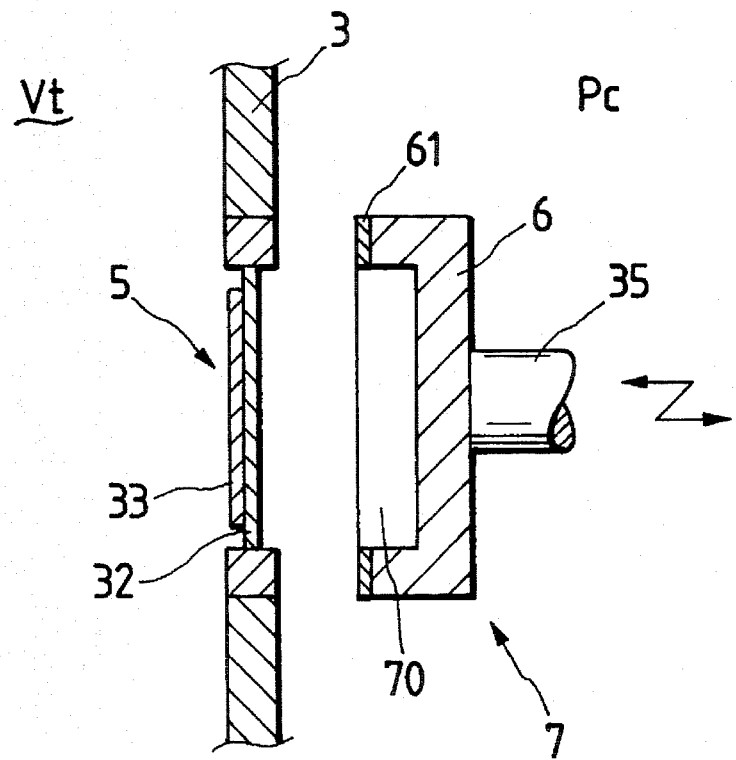

FIG. 13 shows a fifth embodiment of the volumetric measuring apparatus 1.

As can be seen in the drawing, the back chamber housing 6 is shifted directly by lateral movement of the armature 35 of the solenoid valve to selectively establish the communication between the pressure sensor 5 and the inside of the reference enclosure 3 so that the piezoelectric element 33 may be subjected to the pressure in the reference enclosure 3. Attached to an end of the back chamber housing 6 is a rubber seal or packing 61 for establishing liquid-tight seal between an inner wall of the reference enclosure 3 and the back chamber 70 when the back climber housing 6 is urged against the inner wall of the reference enclosure 3.

Figure 14:
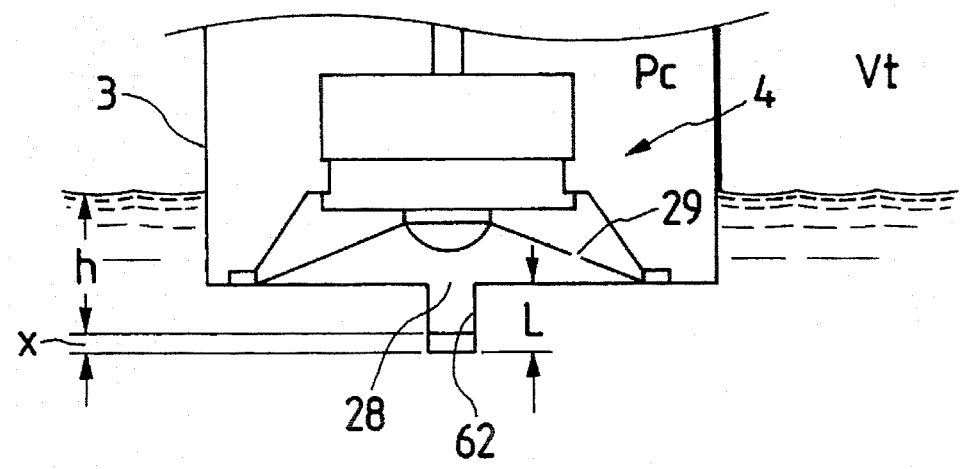
FIGS. 14 and 15 are cross sectional views which show a reference enclosure according to a sixth embodiment of the invention.
Figure 15:
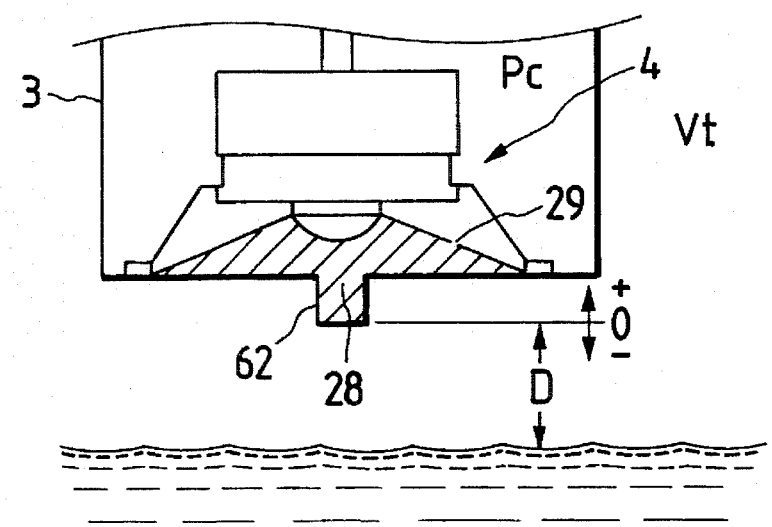
Figure 16:
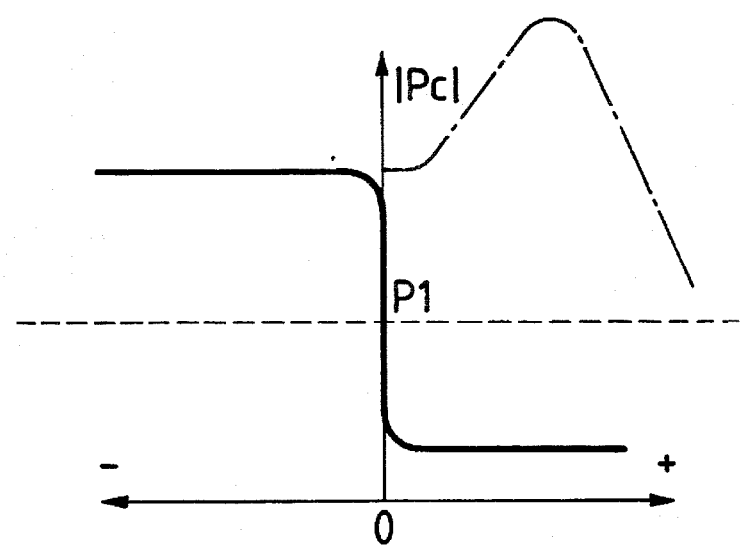
FIG. 16 is a graph which shows a variation in pressure monitored by a pressure sensor caused by a change in surface of a liquid material stored in a fuel tank.

FIGS. 14 to 16 show a sixth embodiment of the volumetric measuring apparatus 1 which includes a cylindrical passage or throat 62 for transmitting a pressure variation produced by the speaker 4 to the fuel tank 2. The throat 62 has a given length L extending downward from the bottom of the reference enclosure 3, and establishes communication between the reference enclosure 3 and the fuel tank 2 through the propagation hole 28. The leakage hole 29 is formed in the diaphragm of the speaker 4.

Thus, the reference enclosure 3 is hermetically sealed except a portion communicating with the fuel tank 2 through the throat 62. This prevents, as can be seen from FIG. 14, the surface of the liquid fuel stored in the fuel tank 2 from entering the reference enclosure 3 even when it reaches above the bottom of the throat 62.

The length L of the throat 62 may be determined in the following manner.

A height x of fuel entering the throat 62 is initially determined using the following equation:
From the balance of static pressure, $$S \cdot x/Vc = \rho \cdot g \cdot h \text{ thus, } x = \rho \cdot g \cdot h \cdot Vc/S \qquad (15)$$

where g is an acceleration acting on the fuel, S is a sectional area of the cylindrical throat 62, h is a height between a given maximum level of the fuel and the lower end of the cylindrical throat 62, and $\rho$ is a specific gravity of the fuel stored in the fuel tank 2.

Next, the length L of the cylindrical throat 62 is so determined as to meet the relation of $L \geq x+a+b$ where a is a change in level of the fuel caused by a maximum inclination thereof and b is a change in level of the fuel caused by vibrations of the surface of the fuel and/or the fuel tank 2.

When the surface of the fuel in the fuel tank 2 lies, as shown in FIG. 14, above the lower end of the cylindical throat 62, a space formed beneath the diaphragm of the speaker 4 is enclosed by the surface of the fuel to form a small cavity, which restricts the diaphragm from vibrating so that the pressure change Pc within the reference enclosure 3 detected by the pressure sensor is decreased. Additionally, when the surface of the fuel which is, as shown in FIG. 15, lies below the lower end of the cylindrical throat 62, rises gradually, the pressure change Pc in the reference enclosure 3 experiences a variation, as shown in FIG. 16, according to an interval D between the surface of the fuel and the lower end of the cylindrical throat 62.

Accordingly, when the pressure change Pc in the reference enclosure 3 detected by the pressure sensor 5, as shown in FIG. 16, becomes smaller than a threshold value P1, the volumetric measuring circuitry 13 of this embodiment concludes that the surface of the fuel in the fuel tank 2 is above the lower end of the cylindrical throat 62, and informs a vehicle operator through the display 47 that the fuel tank 2 is filled up.

As will be discussed below in detail, according to the design of the cylindrical throat, a variation in the pressure change Pc shown by the solid line in FIG. 16 may experiences a variation shown by a broken line so that the pressure change Pc does not become smaller than the threshold value P1 if the fuel tank 2 is filled up. It is, thus, difficult to determine with high accuracy whether the fuel tank is filled up or not. This is due to the resonance phenomena of a vibration system which generates a vibration of a frequency, determined by a mass (m) of the fuel entering the cylindrical throat 62 up to the height x, an air spring constant (ksr) of the propagation hole 28 (i.e., a confined space defined by the surface of the fuel within the cylindrical throat 62 and the diaphragm of the speaker 4), and a mechanical spring constant (ksp) of the diaphragm of the speaker 4, set near an operating frequency of the speaker 4. Thus it is advisable that the vibration system be designed not to resonate at the operating frequency of the speaker 4. The resonance frequency $\omega$ of the vibration system may be given by the following relation according to an equation of motion.

$$\omega = \sqrt{\frac{m}{ksr + ksp}} \qquad (16)$$

It will thus be appreciated that the resonance frequency $\omega$ of the vibration system is expressed as a function of the mass (m) of the fuel entering the cylindrical throat 62 at the height x, the air spring constant (ksr) of the propagation hole 28, and the mechanical spring constant (ksp) of the diaphragm of the speaker 4. Therefore, the detection of the volume of fuel with which the fuel tank 2 is filled is accomplished by setting those parameters to appropriate values, respectively, to eliminate the resonance phenomena of the vibration system.

Figure 18:
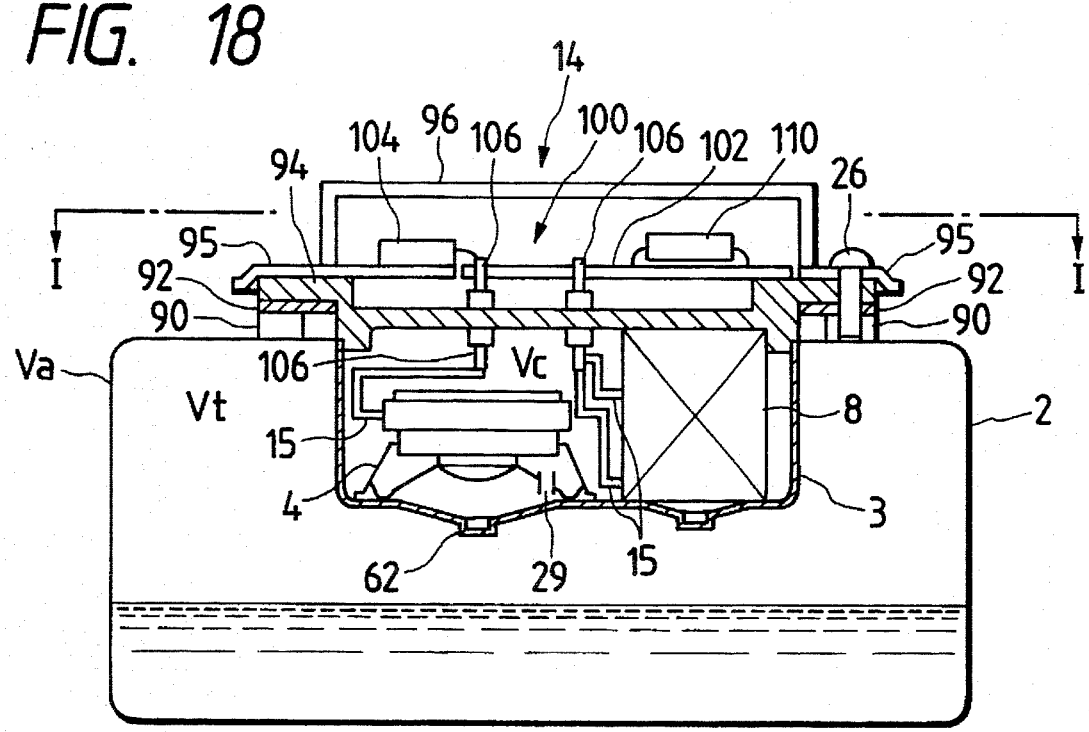
FIG. 18 is a cross sectional view which shows a volumetric measuring apparatus according to a seventh embodiment of the invention.
Figure 19:
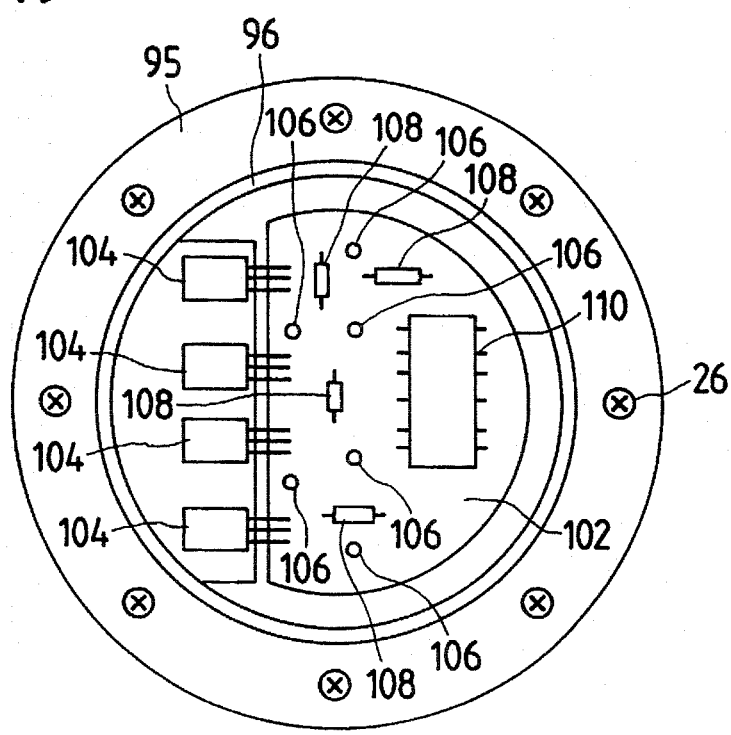
FIG. 19 is a traverse sectional view taken along the line I—I in FIG. 18.

FIGS. 18 and 19 show a seventh embodiment of the volumetric measuring apparatus 1. FIG. 18 is a cross sectional view illustrating a structure of the volumetric measuring apparatus 1. FIG. 19 is a traverse sectional view taken along the line I—I in FIG. 18.

The volumetric measuring apparatus 1 of this embodiment is different from those in the above embodiments in that the speaker 4 and the volumetric measuring assembly 8 are both disposed on the bottom of the reference enclosure 3, and the control unit 14 and the reference enclosure 3 are designed as a unit.

As shown in FIG. 18, a main flange 94 and a metallic flange 95 are attached to each other through a gasket 92 by fastening bolts 26 into nuts or retainers 90 secured on an upper surface of the fuel tank 2. A circuit cover 96 of the control unit 14 is mounted or welded on the metallic flange 95 to define a control unit chamber 100. The main flange 94 isolates the control unit chamber 100 from art internal space of the reference enclosure 3. The metallic flange 95 serves as a heat sink of power elements 104, as will be described later.

On the bottom of the reference enclosure 3, the speaker 4 and the volumetric measuring assembly 8 are arranged in series. Within the control unit chamber 100, a circuit board 102 and the power elements 104 are disposed. The power elements 104 constitute the speaker driver 11 for operating the speaker 4. The circuit board 102 has mounted thereon various electric parts 108 and an integrated circuit 110 which form the opening and closing unit controller 12 and the volumetric measuring circuitry 13.

On the main flange 94, terminals 106 are mounted which electrically connect the reference enclosure 3 with the control unit 14. Through the terminals 106 and lead wires 15, the speaker 4 and the volumetric measuring assembly 8 are connected to the power elements 104 and the circuit board 102, respectively.

As can be seen in the drawings, an arrangement of the speaker 4 and the volumetric measuring assembly 8 on the bottom of the reference enclosure 3 decreases a vertical length of the reference enclosure 3 disposed within the fuel tank 2 to achieve a wide range of volume detection within the fuel tank 2. Additionally, this arrangement offers easier assembly of the volumetric measuring assembly 8 than in the above embodiments wherein it is mounted on a side wall of the reference enclosure 3.

Further, a close arrangement of the circuit board 102 to the main flange 92 forming an upper wall of the reference enclosure 3 eliminates the influence of noise components appearing on signal transmission lines extending from the volumetric measuring assembly 8 for accurate detection of the volumetric of fuel stored within the fuel tank 2.

Figure 20:
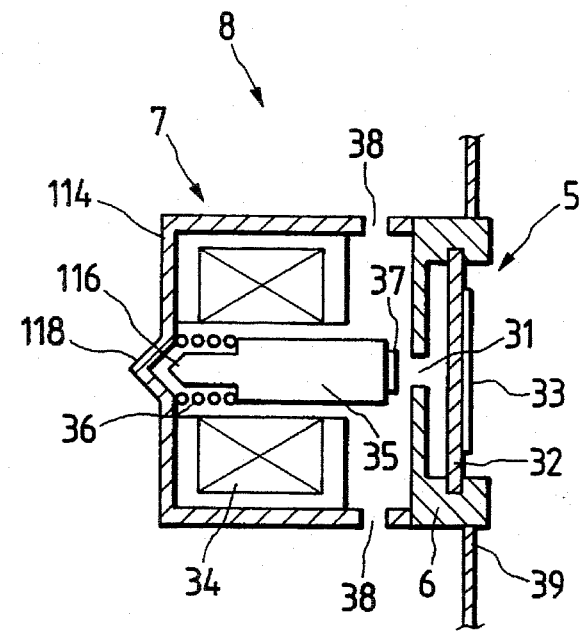
FIG. 20 is a cross sectional view which shows an opening and closing unit of a volumetric measuring assembly according to an eighth embodiment of the invention.

Referring to FIG. 20, there is shown a modified form of the opening and closing unit 7 of the volumetric measuring assembly 8 according to an eighth embodiment.

The opening and closing unit 7 of the this embodiment is different from that of the first embodiment shown in FIG. 4 in that one end portion of the armature 35 is formed with a small-diameter extension whose end is tapered to form a cone 116 and a side wall 114 of a housing has a conical portion 118 bulging outwardly so as to be contoured to the cone 116.

In the first embodiment as mentioned above, when the solenoid 34 is energized by the opening and closing unit controller 12, it will cause the armature 35 to be urged by a magnetic force produced against the spring force of the spring 36, thereby bringing the end 112 of the armature 35 into engagement with the side wall 114 to open the communication port 35 so that an uncomfortable mechanical noise is generated.

Figure 21:
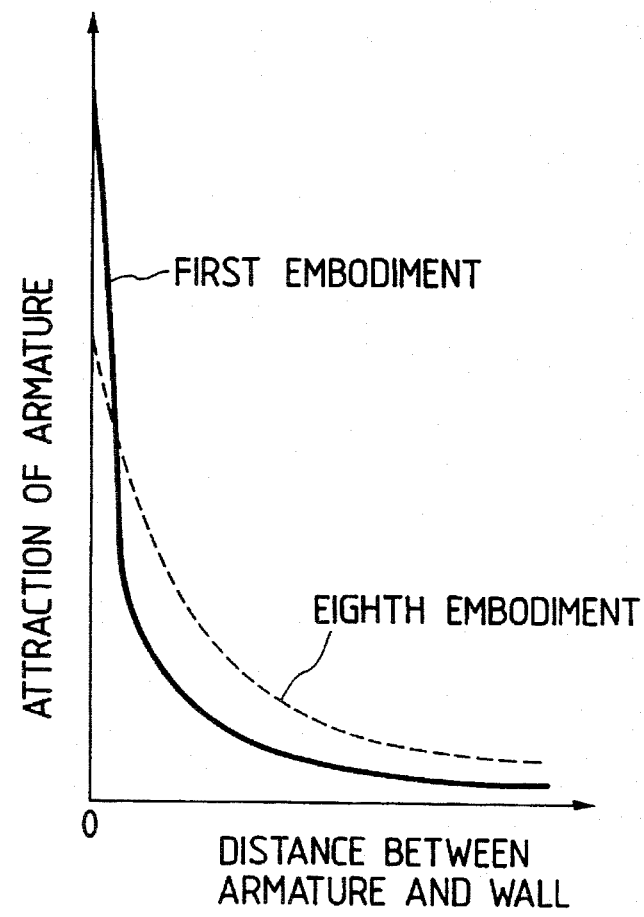
FIG. 21 a graph which shows a relation between an attraction acting on an armature of a solenoid valve of an opening and closing unit and a distance between the armature and a wall of a casing.

In this embodiment, when the solenoid 34 is energized to open the communication port 35, the tapered surface of the cone 116 of the armature 35 collides with an inner tapered wall of the conical portion 118 so that the impact is reduced. An attraction acting on the armature 35 produced by the solenoid 34 is, as shown in FIG. 21, commonly reduced as the armature approaches the side wall 114. An attraction produced by this embodiment becomes smaller than that of the first embodiment immediately before the armature 35 collides with the side wall 114, so that the mechanical noise is decreased.

Additionally, the decrease in mechanical noise is also achieved with circuit design. Specifically, by arranging a capacitor between the switch operable according to a command from the CPU 46 and opening and closing unit 7, the rise of voltage upon actuation of the switch 48 is moderated, thereby reducing the mechanical noise upon collision of the armature 35 with the side wall 114.

Figure 22:
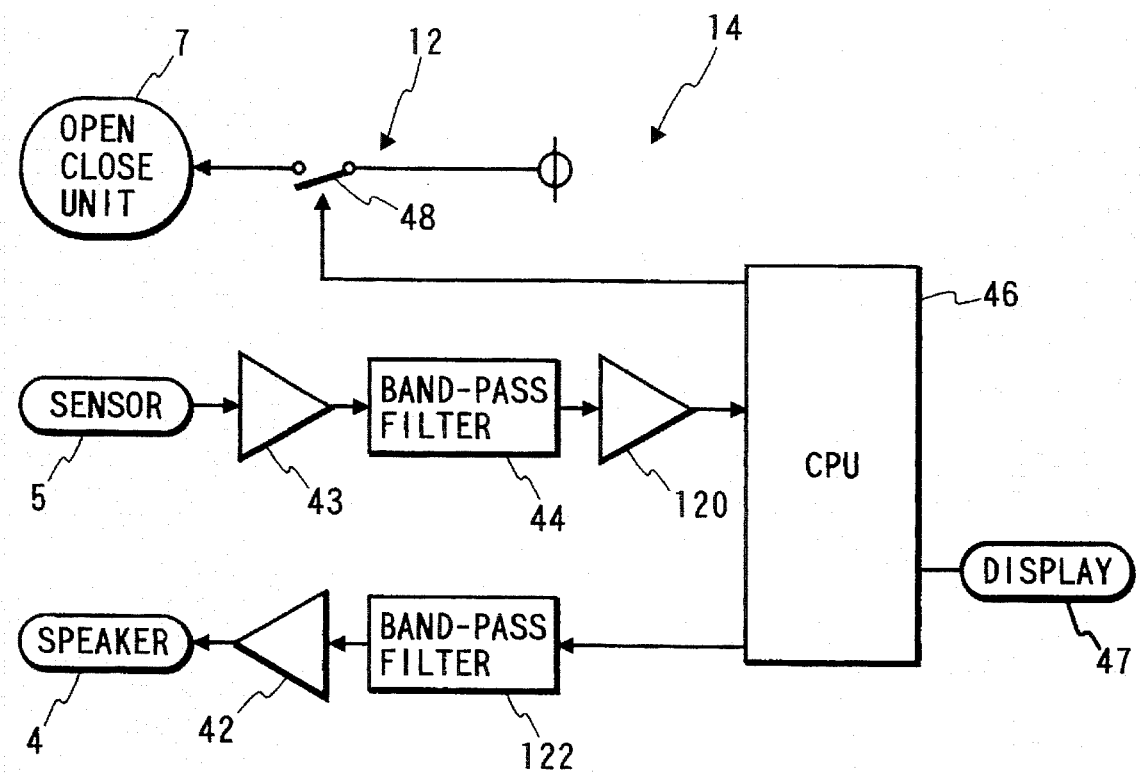
FIG. 22 is a circuit diagram which shows a control unit according to a ninth embodiment of the invention.

FIG. 22 shows a modified form of the control unit 14 according to a ninth embodiment which is designed to operate the speaker 4 using an output signal from the CPU 46 without use of the oscillator 46, as employed in the first embodiment, for producing a high-accuracy oscillation frequency, and to give a function of the phase detector 45 to the CPU 46 for realizing a low-priced circuit arrangement.

The CPU 46 of this embodiment provides a given wave signal to a band-pass filter 122. The band-pass filter 122 removes therefrom high-frequency components, and provides it to the power amplifier 42. The power amplifier 42 amplifies the high-frequency removed signal and produces it to the speaker 4. Additionally, a signal outputted from the pressure sensor 5 is amplified by the preamplifier 43 and then sent to the band-pass filter 44 to remove a noise frequency other than the frequency produced by the CPU 46. The noise-removed signal is then inputted to the CPU 46 through a gain-switching amplifier 120 for determination of the volumes of gas and fuel within the fuel tank 2. Note that the opening and closing unit 12 is the same as in the first embodiment.

It is commonly possible that a wave signal provided for operating a speaker is translated into a pulse signal having a given duty cycle by δ-Σ modulating a sine wave, for example. The CPU 46 of this embodiment produces such a pulse signal directly based on clocks generated therein.

Further, the CPU 46, as mentioned above, a function of the phase detector 45 employed in the first embodiment which will be described below.

Figure 23:
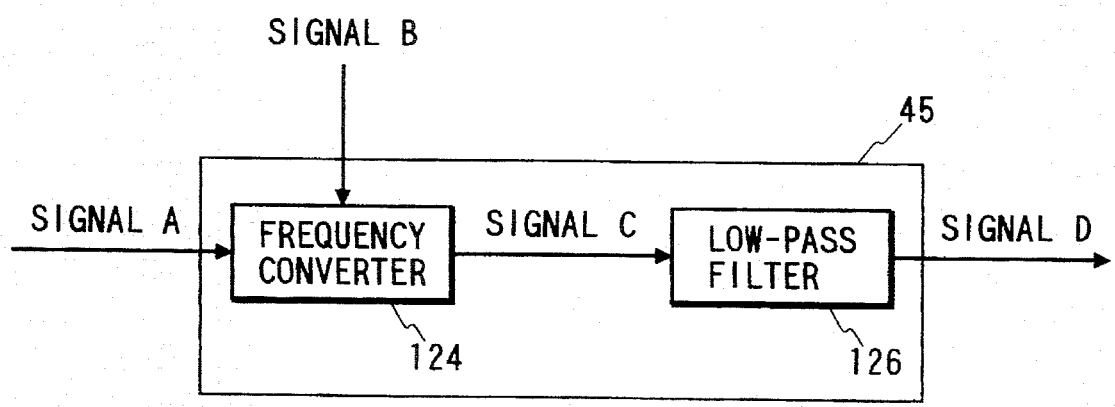
FIG. 23 is a circuit diagram which shows a phase detector of the control unit shown in FIG. 22.

FIG. 23 is a circuit block diagram of a phase detector 45 incorporated in the CPU 46. FIGS. 24(a) to (d) illustrate an operation of the phase detector 45.

The phase detector 45 includes a frequency converter 124 and a low-pass filter 126. To the frequency converter 124, a signal A outputted from the pressure sensor 5 through the gain-switching amplifier 120 and a reference signal B synchronized with an operating frequency of the speaker 4 are inputted. An output signal C from the frequency converter 124 is inputted to the low-pass filter 126.

Figure 24A:
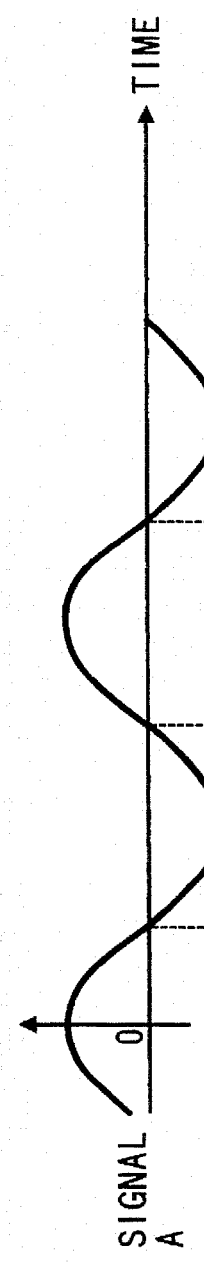
FIGS. 24(a) to 24(d) are time charts which show waveforms of signals inputted to and outputted from the phase detector shown in FIG. 23.
Figure 24B:
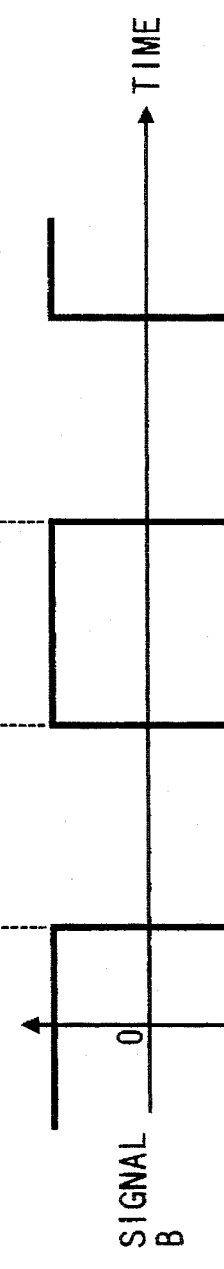
Figure 24C:
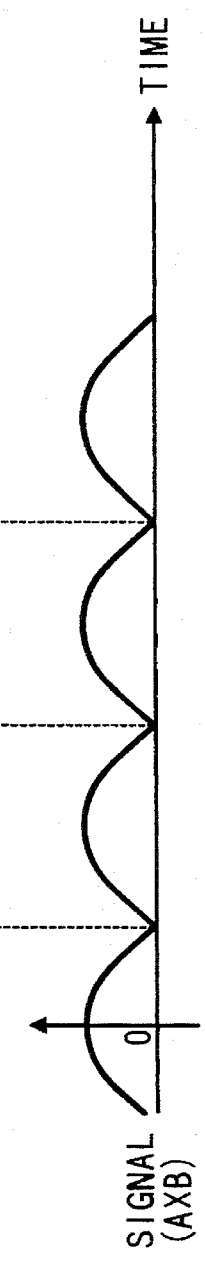
Figure 24D:
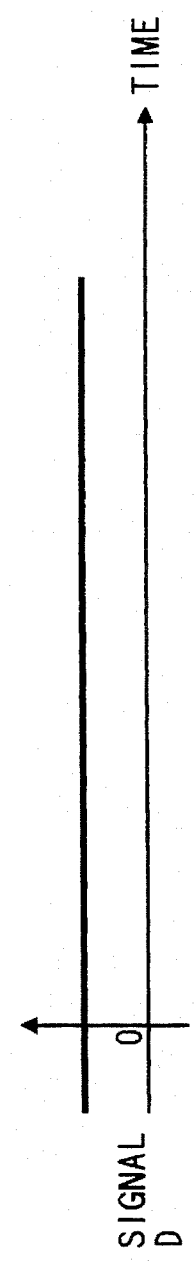

In operation of the phase detector 45, the frequency converter 124 first multiplies the signal A, as shown in FIG. 24(a), 15 and the reference signal B, as shown in FIG. 24(b), together to produce a frequency-converted DC signal C, as shown in FIG. 24(c). This DC signal then passes through the low-pass filter 126 to produce a signal D, as shown in FIG. 24(d), which is used in determining the volume of fuel within the fuel tank 2. An operating wave signal for the speaker 4 may be provided to the band-pass filter 122 through, for example, an A/D converter build in the CPU 46 in addition to a pulse signal, as described above, generated based on clocks in the CPU 46.

A maximum ratio of an output of the pressure sensor 5 when the communication port 31 is opened by the opening and closing unit 7 to that when the communication port 31 is closed, reaches as high as 1000: 1. Thus, amplifying both output signals of the pressure sensor 5 with the same gain requires that a considerably wide dynamic range is given to the CPU 46 receiving the amplified output signals. In this embodiment, however, the use of the gain-switching amplifier 120 allows the CPU 46 to have a decreased dynamic range. Accordingly, it becomes possible to achieve high-accuracy volumetric measurements through an A/D converter having a small number of bits.

Additionally, the use of a unified structure composed of the preamplifier 43, the bad-pass filter 44, and the gain-switching amplifier 120 eliminates the influence of deterioration of the preamplifier 43 and the band-pass filter 44 as a result of age, temperature variation, or design error, acting on calculation in the CPU 46 of a ratio of outputs of the pressure sensor 5 derived when the communication port 35 is opened and when it is closed to determine the volume of fuel stored within the fuel tank 2.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, in addition to measurement of the volume of gas in the fuel tank 2 to determine the volume of the fuel stored therein, it is possible to measure the volume of gas filling, for example, a conventional vessel or a room as long as it is substantially hermetically sealed.

Figure 17:
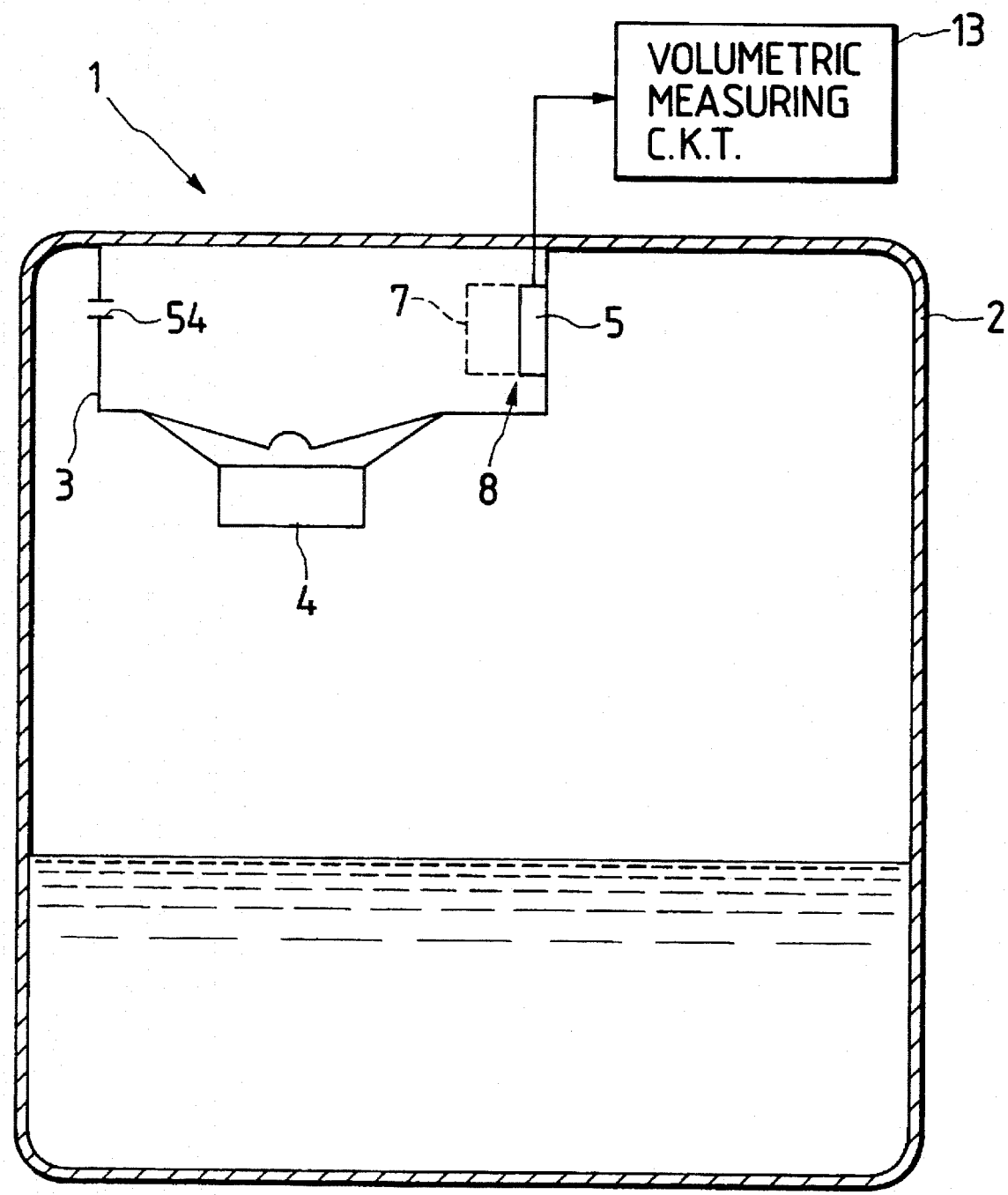
FIG. 17 is a cross sectional view which shows a modification of a volumetric measuring apparatus.

Additionally, the speaker 4 serving as a volume changing means may alternatively be installed, as shown in FIG. 17, outside the reference enclosure 3 to produce a pressure variation within the reference enclosure 3.

Further, while in the above embodiments, the reference enclosure 3 is installed on the inner upper end of the fuel tank 2, it is possible to arrange it at another location, for example, a side wall of the fuel tank 2 where the volume of gas in the fuel tank 2 can be measured.

Moreover, the speaker 4 may alternatively be placed with another suitable volume changing means including, for example, a cylinder communicating with the reference enclosure 3 and the fuel tank 2 and a piston so arranged as to reciprocate within the cylinder.

What is claimed:
1. A volumetric measuring apparatus for measuring the volume of a given material stored within a container comprising:

a reference enclosure, disposed within the container, defining therein a reference cavity having a preselected volume;

pressure balancing means for balancing static pressures in the container and said reference enclosure with each other;

pressure difference producing means for producing a pressure difference between pressures in the container and said enclosure;

a pressure sensor having a pressure sensitive element exposed inside both the container and said reference enclosure, said pressure sensitive element being sensitive to a pressure acting thereon to provide a sensor signal indicative thereof;

sensor mode switching means for switching an operation of said pressure sensor between a first operation mode and a second operation mode, the first operation mode being such that the pressure sensitive element of said pressure sensor is sensitive to said pressure difference between the container and said reference enclosure, the second operation mode being such that the pressure sensitive element of said pressure sensor is sensitive to a pressure only in one of the container and said reference enclosure;

control means for controlling operations of said pressure difference, producing means and said sensor mode switching means in first and second control modes, the first control mode being such that said pressure difference producing means produces said pressure difference between the container and said reference enclosure and said sensor mode switching means activates said pressure sensor in the first operation mode to provide a first sensor signal indicative of said pressure difference, the second control means being such that said pressure difference producing means produces said pressure difference and said sensor mode switching means activates said pressure sensor in the second operation mode to provide a second sensor signal indicative of the pressure in the one of the container and said reference enclosure; and volume determining means for determining the volume of the given material stored within the container based on the first sensor signal and the second sensor signal provided by said pressure sensor.

2. A volumetric measuring apparatus as set forth in claim 1, wherein said volume determining means determines the volume of said given material based on a ratio of outputs values of the first and second sensor signals.

3. A volumetric measuring apparatus as set forth in claim 1, wherein said sensor mode switching means includes a cover member formed to define therein a preselected volume and opening and closing means, said cover member having disposed therein the pressure sensitive element of said pressure sensor, said opening and closing means selectively opening and closing said cover member to establish the first and second operating modes of said pressure sensor.

4. A volumetric measuring apparatus as set forth in claim 3, wherein the preselected volume in said cover member is so defined as to compensate for an error in determining the volume of the given material within the container caused by a variation in internal static pressure of the container.

5. A volumetric measuring apparatus as set forth in claim 4, wherein said volume determining means determines the volume Vf of the given material stored within the container according to the following equation:

$$Vf = Va - Vc \cdot |Pc|/|Pt|$$

where Va is a volume in the container, Vc is a volume in said reference enclosure, Pc is a pressure change in said reference enclosure, and Pt is a pressure change in the container.

6. A volumetric measuring apparatus as set forth in claim 3, said cover member has a communication port which establishes communication between the pressure sensitive element of said pressure sensor and an internal space of the one of the container and said reference enclosure, said opening and closing means being responsive to a control signal from said control means to selectively establish and block said communication to have said pressure sensor assume the first and second operation modes.

7. A volumetric measuring apparatus as set forth in claim 1, wherein said pressure difference producing means is disposed within said reference enclosure and generates a vibration within the container to change a volume in the container, and wherein said pressure sensor detects a pressure change in the container in the second operation mode.

8. A volumetric measuring apparatus as set forth in claim 7, wherein said pressure difference producing means is provided with an acoustic speaker which has a diaphragm oriented toward a bottom of the container and which transmits a preselected frequency of vibration inside the container through a propagation hole formed in the bottom of the container to produce a pressure variation in the container.

9. A volumetric measuring apparatus as set forth in claim 7, wherein said reference enclosure includes a first chamber and a second chamber, said second chamber being disposed on an outer bottom wall of said first chamber and communicating with the first chamber and an internal space of the container through a first opening and a second opening, respectively, and further comprising a float member having a specific gravity smaller than that of the given material to block the second opening when the given material reaches a given level within the container.

10. A volumetric measuring apparatus as set forth in claim 8, wherein the given material stored within the container is liquid, and further comprising capillary means for attracting and directing a portion of liquid collected on the bottom of said reference enclosure to a heating element of the speaker for evaporation.

11. A volumetric measuring apparatus as set forth in claim 1, wherein said reference enclosure includes an inner housing disposed within the container and an outer housing, disposed out of the container, communicating with the inner housing.

12. A volumetric measuring apparatus as set forth in claim 11, wherein said pressure difference producing means, said pressure sensor, and said sensor mode switching means are arranged within the inner housing.

13. A volumetric measuring apparatus as set forth in claim 11, wherein said inner housing of said reference enclosure communicates with said outer housing through an opening formed in the container, said outer housing having a through hole into which a bolt is inserted to secure the outer housing on an outer upper surface of the container.

14. A volumetric measuring apparatus as set forth in claim 1, wherein said reference enclosure has an opening formed in a bottom wall thereof to return a portion of the given material collected on the bottom back into the container.

15. A volumetric measuring apparatus as set forth in claim 1, wherein the pressure sensitive element of said pressure sensor has a surface oriented vertically of said reference enclosure.

16. A volumetric measuring apparatus as set forth in claim 15, wherein said reference enclosure is made of a cylindrical member which has a flat surface formed on a side wall for mounting a volumetric measuring assembly composed of said pressure sensor and said sensor mode switching means.

17. A volumetric measuring apparatus as set forth in claim 7, wherein said reference enclosure has a hollow extension, extending outwardly from a bottom thereof, communicating with an internal space of the container, said hollow extension forming a confined space, defined by a surface of the given material when blocking the communication with the internal space of the container and said pressure difference producing means disposed within said reference enclosure to decrease an internal pressure of said reference enclosure indicated by said pressure sensor below a given threshold value, said volumetric determining means determining that the container is filled with the given material when said internal pressure indicated by said pressure sensor is smaller than said given threshold value.

18. A volumetric measuring apparatus as set forth in claim 17, wherein said hollow extension having a length L which is so determined as to satisfy the following relation:

$$L \geq x + a + b$$

where a is a change in level of the given material caused by a maximum inclination thereof within the container, b is a change in level of the given material caused by vibrations of the surface of the given material, and x is given by the relation of $x = \rho \cdot g \cdot h \cdot Vc/S$ where g is an acceleration acting on the given material, S is a sectional area of said hollow extension, h is a height between a preselected maximum level of the given material within the container and an lower end of said hollow extension, $\rho$ is a specific gravity of the given material, and Vc is the given volume of said reference enclosure.

19. A volumetric measuring apparatus as set forth in claim 17, wherein said hollow extension is designed to have a resonance frequency ω which is different from a vibration frequency of said pressure difference producing means and which is determined by the following relation:

$$\omega = \sqrt{\frac{m}{ksr + ksp}}$$

where m is a mass of the given material, ksr is air spring constant of said confined space of said hollow extension, and ksp is a mechanical spring constant of a vibration producing means of said pressure difference producing means.

20. A volumetric measuring apparatus as set forth in claim 1, wherein said control means includes a circuit board, said pressure sensor and said sensor mode switching means being incorporated within a volumetric measuring assembly which is disposed within said reference enclosure, said circuit board being mounted over the volumetric measuring assembly.

21. A volumetric measuring apparatus as set forth in claim 20, wherein said reference enclosure has an opening enclosed by a flange member which is mounted on an upper outer surface of the container, said circuit board being secured on said flange member.

22. A volumetric measuring apparatus as set forth in claim 6, wherein said opening and closing means includes a casing having a wall and a movable member movable into engagement with the wall of the casing to establish the communication between the pressure sensitive element of said pressure sensor and the internal space of the one of the container and said reference enclosure, said movable member having a tapered end portion, the wall of said casing having a tapered bulge portion for receiving therein the tapered end portion of said movable member when said communication is established.

23. A volumetric measuring apparatus as set forth in claim 7, wherein said control means includes a phase detector which extracts an output signal component outputted by said pressure sensor having a frequency produced for operating said pressure difference producing means, and which outputs the extracted signal component to said volume measuring means.

24. A volumetric measuring apparatus as set forth in claim 7, wherein said control means includes a phase detector which combines the sensor signal from said pressure sensor and a signal synchronizing with a frequency of the vibration produced by said pressure difference producing means to provide a DC signal to said volume determining means.

* * * * *